United States Patent [19]

Brockway et al.

[11] 3,903,339

[45] Sept. 2, 1975

[54] GLASS CONTAINER COATED WITH PLASTIC CONTAINMENT FILM AND METHOD OF MAKING

[75] Inventors: M. Clifford Brockway; Richard I. Hunter, both of Columbus; Robert E. Sharpe, Worthington, all of Ohio

[73] Assignee: Liberty Glass Company, Sapulpa, Okla.

[22] Filed: May 25, 1973

[21] Appl. No.: 364,095

[52] U.S. Cl.............. 428/35; 215/1 C; 215/DIG. 6; 260/883; 427/407; 427/416; 428/429; 428/440; 428/441
[51] Int. Cl.² .................. B65D 23/08; C03C 17/32
[58] Field of Search ........ 117/124 E, 124 F, 72, 92, 117/94, 6, 161 UN; 215/1 C, DIG. 6

[56] References Cited
UNITED STATES PATENTS

| | | | |
|---|---|---|---|
| 2,923,646 | 2/1960 | Jordan | 117/161 UN |
| 2,929,525 | 3/1960 | Glover | 215/DIG. 6 |
| 3,008,850 | 11/1961 | Ulrich | 117/161 UN X |
| 3,131,077 | 4/1964 | Barnby | 117/124 E |
| 3,328,482 | 6/1967 | Northrup et al. | 117/124 F X |
| 3,503,918 | 3/1970 | LeSota et al. | 117/161 UN X |
| 3,507,680 | 4/1970 | Kiel | 117/124 F X |
| 3,772,061 | 11/1973 | McCoy et al. | 117/94 X |
| 3,823,032 | 7/1974 | Ukai | 117/94 X |

*Primary Examiner*—Ralph Husack
*Attorney, Agent, or Firm*—Koenig, Senniger, Powers and Leavitt

[57] ABSTRACT

A container having improved mechanical service strength and shatter resistance comprising a glass container body and a plastic containment coating film overlying the outside surface of the glass body. The mechanical properties of the film are such that, when subjected to tensile testing at room temperature and a film extension rate of 10 in./min., said film exhibits a tensile strength of at least about 300 lbs./sq. in., an elongation of at least about 80% and a modulus of elasticity in tension which is less than about 1,000 lbs./sq. in. substantially throughout the course of the extension of the film. The coating is substantially uniformly adhered to the glass body but with a peel strength of less than about 1.6 lbs./in. The desired peel strength may be provided by use of an adherency modifying primer coating which provides uniform adherence of the containment coating film to the glass body but limits that adherency to the desired peel strength.

19 Claims, No Drawings

GLASS CONTAINER COATED WITH PLASTIC CONTAINMENT FILM AND METHOD OF MAKING

BACKGROUND OF THE INVENTION

This invention relates to the field of glass containers and more particularly to a container of improved mechanical service strength and shatter resistance having a plastic containment coating film whose adherence to the outside surface of the glass is limited so as to maximize the containment capability of the film.

In the container industry, substantial efforts have been devoted to developing methods for improving the impact and burst strength of glass containers without significantly adding to the cost of producing such containers. Improvement in impact and burst strength can provide not only important economic benefits through reduced attrition, but can also make critical contributions to the personal safety of those who fill, handle and use glass containers.

A substantial effort has been underway in the art to develop containment coatings which improve the resistance of a glass beverage container to impact or burst failure. In recognition of the fact that prevention of such failure under all possible conditions of handling is an objective whose economical attainment is very difficult, if not impossible, much effort has also been devoted to the development of means for mitigating the consequences of the failure of a glass container. Thus, important objects have been to minimize both the degree of fragmentation and the extent of scatter of the fragments produced when a glass bottle fails.

Each of the properties of the impact resistance, burst strength, resistance to fragmentation and minimization of scatter is particularly important where a beverage bottle is used for packaging a carbonated beverage. Bottles for carbonated beverages are routinely exposed to inernal pressures in the range of about 50 psig. If and when such a bottle is broken, the resulting fragments, particularly if they are very small, can be propelled at high velocity by the carbon dioxide which is released. If these fragments strike a person, serious injuries may result. Occasionally a beverage bottle explodes due to the force of internal pressure alone. Serious injuries have been caused by exploding beverage bottles.

As a means of improving the mechanical properties of beverage bottles in the above-noted respects, it has been proposed to provide such bottles with a "containment" or protective coating. Compositions and processes are known, for example, which may be utilized to provide a glass container with a relatively thick coating of styrene foam. Styrene foam coatings are esthetically undesirable since they are white and opaque, thus preventing observation of the contents of the bottle. Glass containers are also known to have an outer lubricating film of polyethylene over an intermediate layer of a metal oxide such as a tin or titanium oxide for abrasion protective purposes. However, these in themselves do not provide satisfactory impact resistance and containment.

As a result of the conditions encountered in the filling, handling and usage of a beverage bottle; a containment coating must meet a number or diverse criteria in addition to the mechanical properties noted above. Thus, in order to maintain its own integrity and effectiveness, the coating should be substantially resistant to abrasion. To avoid interference with visual observation of the bottle's contents, the coating preferably possesses a high degree of clarity. To survive general usage and, in particular, to survive bottling plant processing, the coating should be resistant to both alkali and hot water. In order to minimize fire hazards in the process of coating the bottle, the containment coating composition should not include significant proportions of flammable organic solvents, and desirably should be water based. Finally, the containment coating must be inexpensive to formulate and apply, failing which its use and application to beverage bottles are not feasible or practically economical.

An especially effective containment coating is that described in the copending and coassigned application of Brockway and Sharpe, Ser. No. 364,094, filed May 25, 1973 which application is herein explicitly incorporated by reference. In brief, Brockway and Sharpe describe a containment coating constituted by a plastic film which when subjected to tensile testing at a film extension rate of 10 in./min. exhibits a tensile strength of not less than about 300 lbs./sq. in., an elongation of not less than about 80% and a modulus of elasticity in tension which is less than about 1,000 lbs./sq. in. throughout the course of the extension of the film. A 2-4 mil thick film having these mechanical properties has been demonstrated to afford superior containment as compared to that afforded by previously known containment coatings of similar thickness. Despite the remarkable containment provided by films having the aforesaid mechanical properties, however, pressurized beverage bottles coated with such films may still fail with substantial scattering of fragments when subjected to sufficiently severe impact conditions. An important need continues to exist, therefor, for further improvement in the mechanical service strength and scatter resistance obtainable by the use of plastic containment coating films.

SUMMARY OF THE INVENTION

It is an object of the present invention, therefore, to attain further improvement in the mechanical service strength and shatter resistance afforded by the presence of a containment coating on a glass container. It is also an object of the present invention to provide such improvement without material sacrifice in the clarity or alkali resistance of the containment coating. It is a further object of the present invention to provide an improved method for the production of glass containers having high mechanical service strength and shatter resistance. Other objects and features will be in part apparent and in part pointed out hereinafter.

Briefly, therefore, the present invention is directed to a container having improved mechanical service strength and shatter resistance comprising a glass container body and a plastic containment coating film overlying the outside surface of said body. The mechanical properties of the film are such that, when subjected to tensile testing at room temperature and a film extension rate of 10 in./min., the film exhibits a tensile strength of at least about 300 lbs./sq.in., an elongation of at least about 80% and a modulus of elasticity in tension which is less than about 1,000 lbs./sq. in. substantially throughout the course of the extension of the film. The film is substantially uniformly adhered to the outside surface of the glass body of the container but with a peel strength of less than about 1.6 lbs./in. The present invention is further directed to an improvement in a method for imparting improved mechanical strength to a container having a glass body. In this method a plastic containment coating film having the aforesaid mechanical properties is applied over the outside surface of the container. The improvement comprises applying an adherency modifying primer coating over the outside surface of said body prior to the application of the plastic containment coating film. The primer coating is effective to afford substantially uniform adherence of the plastic film to the glass body but with a peel strength of less than about 1.6 lbs./in.

DESCRIPTION OF THE PREFERRED EMBODIMENTS

Although it has previously been recognized that the degree of adherence of an armor coating to a glass container may be an important factor affecting the overall strength of such a container, it has generally been considered desirable to maximize such adherence in order to improve the mechanical properties of the container. For example, Smith and Wells U.S. Pat. No. 3,362,843 describes glass aerosol bottles having a relatively thick exterior coating of a vinyl resin adhered to the outside of the bottle with a peel strength that is increased to as high as about 50 lbs./in. by use of a primer coating containing methyl methocrylate, an epoxy resin and a silane. More recently, however, it has been recognized that improved protection against shatter is achieved if there is only a slight adhesion between the glass and coating.

In accordance with the present invention, it has been discovered that significantly improved containment properties are achieved by providing a plastic film containment coaating which is substantially uniformly adhered to the outside surface of the glass body of a container, but with a controlled peel strength which is substantially less than the normal peel strength obtained when a plastic coating film is prepared by curing a precursor composition on the surface of the glass. The reasons for which a low degree of adherence is advantageous are not fully understood. It is believed, however, that low adherence tends to reduce the propensity of a fracture front in the glass body to propagate itself into the containment coating, perhaps by impeding or damping energy transmission from the glass to the plastic film.

As disclosed in the aforesaid application of Brockway and Sharpe, highly advantageous containment is afforded by a plastic containment coating film whose properties are such that, when subjected to tensile testing at room temperature and a film extension rate of 10 in./min., the film exhibits a tensile strength of at least about 300 lbs./sq. in., an elongation of at least about 80% and a modulus of elasticity in tension which is less than about 1,000 lbs./sq. in. substantially throughout the course of extension of the film. Such a film may be provided by dip coating a glass bottle or the like in an acrylic latex containing at least about 46.5% by weight resin solids constituted by a copolymer containing about 12% by weight repeating units derived from acrylonitrile and about 85% by weight repeating units derived from ethyl acrylate, such as that sold under the trade designation "Hycar 2679" by B. F. Goodrich Company, and curing the wet coating.

For a containment coating film having the aforesaid mechanical properties, it has been found that containment is materially enhanced if the peel strength of the adherence of the containment film on the glass bottle is less than about 1.6 lbs./in. as determined by slowly peeling a one half inch wide strip from the side of the bottle by force applied normal to the side of the bottle. Preferably, the peel strength is even lower, i.e., about 1.0 lb./in. or less, and a practical optimum peel strength for the adherence of such a containment film is considered to be between about 0.60 and 0.70 lb./in. From a containment standpoint alone, even lower peel strengths may be desirable but some minimum strength is necessary to insure substantially uniform adherence of the containment film to the glass body for purposes of appearance.

In accordance with the present invention, the desired limited degree of adherency may be provided by initially applying to the outside surface of the glass body an adherency modifying primer coating which is effective to reduce the adherency of the containment coating to the desired extent. Among the adherency modifying primer coatings effective for this purpose are polyethylene, silicone resins and montan wax. A particularly useful source of polyethylene is the polyethylene emulsion sold under the trade designation "SC-100" by New Jersey Specialty Chemicals, Inc. Other satisfactory sources of adherency modifiers are the dimethyl silicone resin emulsions sold under the trade designations "SM-2033" and "SM-2040" by General Electric.

An adherency modifying primer coating of polyethylene can conveniently be provided by spraying a polyethylene emulsion, such as SC-100, over the outside surface of an uncoated bottle, or allternatively a bottle precoated with tetraisopropyl titanate, and drying the resultant wet primer coating. In a conventional glass bottle manufacturing operation, such a coating may be applied to the bottles emanating from the lehr at a point where their temperature has dropped to approximately 250°F. The residual heat retained by the bottles at this temperature facilitates the drying process. Aqueous emulsions of other adherency modifiers can be applied in a similar fashion. Alternatively, the adherency modifying primer coating may be applied in an organic solvent or directly as a molten liquid or powder coating.

Only a smsall amount of the adherency modifying primer coating is necessary to provide the desired degree of reduction in the peel strength for a subsequently applied plastic containment coating film. Thus, only about 0.01 mg./sq. in. of polyethylene will afford a significant reduction in the adherence of a conntainment film derived from an acrylic latex, and approximately 0.03 mg. of polyethylene per sq. in. provides preferred adherency characteristics for a film derived from a latex such as "Hycar 2679". The exact optimum amount of adherency modifying primer may vary somewhat depending on the identity of the primer and of the containment coating film but the proper amount can be readily determined by simple experimentation.

After the primer coating composition has been applied to the outside surface of the glass container and dried as necessary, the plastic containment coating film is applied over the outside surface of the primer coating. In a preferred embodiment of the invention, the container bearing the primer coating is dipped in a containment coating composition comprising an acrylic latex such as Hycar 2679. This coating composition may appropriately include thickeners to impart a viscosity effective to provide the desired wet coating thickness. Cross-linkers may also be included in the containment coating composition to promote high caustic resistance in the cured acrylic film.

Curing of an acrylic latex is accomplished by any convenient method, for example, passage through a forced-air oven at a temperature of 350°–500°F. °F. for a period of 3–15 minutes. In the case of an acrylic latex, such as Hycar 2679, it is normally necessary that cure conditions be carefully controlled in order to provide sufficient curing for adequate caustic resistance but to avoid excessive curing which has been found to adversely affect containment properties. A unique advantage of the method of the present invention is that the presence of the adherency modifying primer coating allows a very thorough cure of the acrylic latex without any material adverse effect on containment. It appears that excessive curing tends to promote too firm a bond between film and glass but the presence of the primer coating interferes with such bonding and controls adherency at the desired level. As a result, manufacturing process control requirements are substantially less stringent and critical than they would otherwise be, and a consistently high degree of containment can be realized at relatively high production rates at low cost.

The following examples illustrate the invention:

EXAMPLE 1

A containment coating composition was prepared containing 100 parts Hycar 2679 and 2 parts of a 1% solution of a polyacrylamide sold under the trade designation "Polyhall 295" by Stein Hall and Company. A number of beverage bottles were dip coated in this composition and the wet coatings were air dried at room temperature and then cured for 4 minutes at 450°F. in a forced-air oven. Certain of the bottles coated in this manner had been precoated with tetraisopropyl titanate (a conventional glass coating agent), others had been precoated with a polyethylene emulsion sold under the trade designation SC-100, still others had been precoated with a tetraisopropyl titanate followed by SC-100, and certain others had no precoat. In some cases, the various precoats were applied by standard production processes, while in others an SC-100 coating was applied in the laboratory either on bare glass or on a bottle which had received various precoats in production facilities The bottles which received the various combinations of precoat and containment coating included both 10-oz. and 16-oz. beverage bottles. Containment tests were conducted on both types of bottles. Preparatory to these tests, the 10-oz. bottles were filled with water leaving a 12-cc. head space and the 16-oz. bottles were filled with water leaving a 22-cc. head space. All of the bottles were capped and pressurized to 57 psig with argon, then dropped from a horizontal orientation of the bottle axis from a height of 4 feet onto a 1/16-inch thick vinyl asbestos tile supported on a 1-foot square concrete block. Under these test conditions the glass bodies of all of the bottles failed. To determine the degree of containment for each bottle, measurements were made of the percent by weight of the bottle contained in the largest single cluster, and the weight distribution of the fragments of the bottle about the point of impact. The results of these tests are set forth in Table 1.

Table 1.

Containment of Bottles Versus Coating Variables

| | Pre-Dip Spray Coating" Production Applied | | | Production Applied | | | | Fragment Containment From Pressurized 4-Foot Drop Tests | | | |
|---|---|---|---|---|---|---|---|---|---|---|---|
| | | | | | | | | | Distribution of Bottle As Fragments About The Point of Drop Impact, Percent | | |
| Ex. | None | TPT Only | TPT Plus SC-100 | TPT Plus Lab Applied SC-100 | Lab Applied SC-100 Only | Dip Applied Blend No. 7 Coating" Approximate, mils | Bottle Type | Peel Strength lb./in." | Percent of Bottle Contained in Largest Single Cluster | About The Point of Fragments Residing on Foot-Square Impact Block | Fragments Inside A Radius of 2½ Ft. From Center of Impact | Total No. of Fracture Fragments |
| A | — | — | X | — | — | none | Standard 10 oz. N.R. | — | No clusters | 24 | 82 | 120 |
| B | X | — | — | — | — | 2.1 | " | (Too high to peel) | 26 | 34 | 90 | 30 |
| C | — | X | — | — | — | 2.4 | " | (Too high to peel) | 21 | 30 | 90 | 29 |
| D | — | — | — | X | — | 2.4 | " | 0.78 | 95 | 57 | 100 | 2 |
| E | — | — | — | — | X | 2.2 | " | 0.68 | 98 | 86 | 100 | 5 |
| F | X | — | — | — | — | 2.4 | 10 oz. Coke N.R. | (Too high to peel) | 17 | 23 | 98 | 43 |
| G | X | — | — | — | — | 3.4 | " | (Too high to peel) | 38 | 53 | 99 | 15 |
| H | X | — | — | — | — | 4.1 | " | (Too high to peel) | 57 | 67 | 98 | 18 |
| I | — | — | — | — | X | 2.7 | " | — | 94 | 100 | 100 | 6 |
| J | — | — | X | — | — | none | Standard 16 oz. N.R. | — | No clusters | 10 | 67 | 155 |
| K | — | — | X | (Plus lab. applied SC-100) | — | 2.6 | " | — | 100 | 100 | 100 | 1 |
| L | — | — | X | (Partially removed by cleaning) | — | 2.2 | Light Weight 10 oz. | (Too high to peel) | 15 | 14 | 69 | 42 |
| M | — | — | X | — | — | 2.3 | " | 1.16 | 62 | 80 | 100 | 7 |
| N | — | — | X | (Plus lab. applied | — | 2.3 | " | 0.74 | 99 | 0 | 100 | 5 |

Table 1.-continued

Containment of Bottles Versus Coating Variables

| Ex. | Pre-Dip Spray Coating[a] Production Applied | | | Production Applied | | Bottle Type | Peel Strength lb./in.[c] | Fragment Containment From Pressurized 4-Foot Drop Tests | | |
|---|---|---|---|---|---|---|---|---|---|---|
| | | | | | | | | Percent of Bottle Contained in Largest Single Cluster | Distribution of Bottle As Fragments About The Point of Drop Impact, Percent | | |
| | None | TPT Only | TPT Plus SC-100 | TPT Plus Lab Applied SC-100 | Lab Applied SC-100 Only | Dip Applied Blend No. 7 Coating[b] Approximate, mils | | | | About The Point of Fragments Residing on Foot-Square Impact Block | Fragments Inside A Radius of 2½ Ft. From Center of Impact | Total No. of Fracture Fragments |
| | | | | | | SC-100) | | | | | | |

[a]Bottles were sprayed while hot (~300°F. in production, 250°F. in the lab.) with dilute water-based emulsion of TPT (tetraisopropyl titanate) and/or SC-100 (Polyethylene).
[b]Hycar 2679 plus 2 parts, 100 parts 2679 of 1 percent Polyhall 295. Coatings were air-dried and cured 4 minutes in 450°F. hot-air oven.
[c]Adherence measured for a ½ inch wide strip of coating pulled off at right angles to the bottle surface in a slow continuous motion while measuring the pull in pounds.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A container having improved mechanical service strength and shatter resistance comprising a glass container body, a plastic containment coating film overlying the outside surface of said body and an adherency modifying primer coating between the outside surface of said body and the inside surface of said plastic containment coating film through which the containment film is substantially uniformly adhered to said body but with a peel strength of less than about 1.6 lb/in., the mechanical properties of said plastic containment coating film being such that, when the film is subjected to tensile testing at room temperature and a film extension rate of 10 in./min., said film exhibits a tensile strength of at least about 300 lb/in$^2$, an elongation of at least about 80% and a modulus of elasticity in tension which is less than about 1,000 lb/in$^2$ substantially throughout the course of extension of the film.

2. A container as set forth in claim 1 wherein the peel strength is not substantially greater than about 1.0 lb./in.

3. A container as set forth in claim 1 wherein said adherency modifying primer coating is selected from the group consisting of polyethylene, a silicone resin and montan wax.

4. A container as set forth in claim 3 wherein said peel strength is not substantially greater than about 1.0 lb./in.

5. A container as set forth in claim 4 wherein said peel strength is between about 0.60 and about 0.70 lb./in.

6. A container as set forth in claim 1 wherein said plastic is an acrylic plastic.

7. A container as set forth in claim 6 wherein said plastic is constituted by a copolymer of ethyl acrylate and acrylonitrile.

8. A container as set forth in claim 1 wherein said copolymer contains approximately 85% by weight repeating units derived from ethyl acrylate and approximately 12% by weight repeating units derived from acrylonitrile.

9. A container as set forth in claim 6 wherein said film is obtained by curing a coating composition comprising an acrylic latex.

10. A container as set forth in claim 1 wherein said plastic containment coating film has a thickness of between about 2 and about 5 mils.

11. In a method of imparting improved mechanical service strength to a container having a glass body which comprises applying a plastic containment coating film to the outside surface of said body, the improvement which comprises applying an adherency modifying primer coating over the outside surface of said body prior to the application of the plastic containment coating film, said primer coating being effective to afford substantially uniform adherence of said plastic coating to said body, but with a peel strength of less than about 1.6 lb/in.; and applying over said primer coating a plastic coating film whose mechanical properties are such that, when subjected to tensile testing at room temperature and a film extension rate of 10 in./min., said film exhibits a tensile strength of at least about 300 lb/in$^2$, an elongation of at least about 80% and a modulus of elasticity in tension which is less than about 1,000 lb/in$^2$ substantially throughout the course of extension of the film.

12. In a method as set forth in claim 1, said peel strength being less than about 1.0 lb./in.

13. In a method as set forth in claim 12, said peel strength being between aabout 0.60 and about 0.70 lb./in.

14. In a method as set forth in claim 11, said plastic being an acrylic plastic.

15. In a method as set forth in claim 14, said plastic being constituted by aa copolymer of ethyl acrylate and acrylonitrile.

16. In a method as set forth in claim 15, said copolymer containing approximately 85% by weight repeating units derived from ethyl acrylate and approximately 12% repeating units derived from acrylonitrile.

17. In a method as set forth in claim 14, said plastic containment coating being provided by curing a composition comprising an acrylic latex.

18. In a method as set forth in claim 11, said adherency modifying primer coating being selected from the group consisting of polyethylene, a silicone resin, and montan wax.

19. In a method as set forth in claim 11, said plastic containment coating film having a coating thickness of between about 2 and about 5 mils.

* * * * *